United States Patent [19]

Debush

[11] Patent Number: 5,305,783

[45] Date of Patent: Apr. 26, 1994

[54] ELASTOMERIC SLEEVE AND METHOD FOR ASSEMBLING THE SLEEVE ON A ONE-WAY VALVE BODY

[75] Inventor: George Debush, Hamden, Conn.

[73] Assignee: ReSeal International Limited Partnership, New York, N.Y.

[21] Appl. No.: 58,993

[22] Filed: May 6, 1993

Related U.S. Application Data

[63] Continuation of Ser. No. 816,632, Dec. 31, 1991, abandoned.

[51] Int. Cl.⁵ ............................................. F16K 15/14
[52] U.S. Cl. ..................................... 137/853; 604/247
[58] Field of Search ........................ 137/853; 604/247

[56] References Cited

U.S. PATENT DOCUMENTS

| | | | |
|---|---|---|---|
| 2,107,596 | 2/1938 | Bourdon | 137/853 |
| 3,259,281 | 7/1966 | Pikoske | 137/853 X |
| 3,692,071 | 9/1972 | Begleiter | 137/853 X |
| 4,846,810 | 7/1989 | Gerber | 137/853 X |
| 5,092,855 | 3/1992 | Pardes | 137/853 X |

*Primary Examiner*—Robert G. Nilson
*Attorney, Agent, or Firm*—Anderson Kill Olick & Oshinsky

[57] ABSTRACT

A one-way valve for dispensing a fluid material from a container includes an axially extending valve body and an elastomeric sleeve stretched over the valve body in tightly fitting contact with it. A ring shaped enlargement is formed monolithically on each end of the sleeve and fits in sealed contact with reduced diameter portions at the opposite ends of the valve body. The sleeve can be assembled on the valve body in a variety of ways including mechanically expanding the sleeve and placing it on the valve body. The enlargements at the ends of the valve body have a thickness dimension in the radial direction in the range of 2 to 4 times the thickness of the sleeve between the enlargements.

9 Claims, 4 Drawing Sheets

ELASTOMERIC SLEEVE AND METHOD FOR ASSEMBLING THE SLEEVE ON A ONE-WAY VALVE BODY

This is a continuation of application Ser. No. 07/816,632 filed Dec. 31, 1991, now abandoned.

BACKGROUND OF THE INVENTION

The present invention is directed to an elastomeric sleeve tightly fitted on a one-way valve body. The sleeve is secured so that it is in sealed contact with the surface of the valve body. Flow is conducted through the valve body via a first and a second outlet passageways with the passageways arranged in spaced apart relation so that there is no direct flow between them. The passageways extend through the valve body each opening through the outside surface of the valve body to the inside surface of the sleeve. With pressurized flow of a fluid through the valve body, the fluid flows first through one of the passageways into a space between the outside surface of the valve body and the inside surface of the sleeve and then into the other passageway and out of the valve body. The elastomeric sleeve expands to permit flow out of the valve body and, when the outward flow is completed, rebounds into contact with the surface of the valve body preventing any return flow.

In U.S. Pat. No. 4,846,810, a valve assembly, known as the ReSeal Valve, includes a one-way valve body laterally enclosed within an elastomeric sheath or sleeve. The sleeve fits tightly about the valve body and provides a closure for a first outlet passageway and a second outlet passageway not directly connected to one another. The elastomeric sleeve is sealed to the outside surface of the valve body by O-rings, adhesives, or by thermally or chemically bonding the sleeve to the valve body. The seal is required to assure that flow into an inlet end of the valve body is directed between the outside surface of the valve body and the inside surface of the elastomeric sleeve and then flows through a passageway to the valve body outlet. If the sleeve is free at one or both ends, the fluid being dispensed could escape and contaminants could enter into the passageways in the valve and eventually into a container holding the fluid to be dispensed through the one-way valve. Accordingly, providing a positive seal between the outside surface of the valve body and the elastomeric sleeve is a prerequisite to assure that the contents of the container are not contaminated during or following use of the one-way valve.

While the ReSeal Valve has proven to be effective, the use of separate O-rings seals or other means for maintaining a seal between the elastomeric sleeve and the valve body has affected the cost of the sleeve and O-rings, and of the procedure in assembling the sleeve on the valve body.

SUMMARY OF THE INVENTION

Therefore, it is the primary object of the present invention to provide an elastomeric sleeve monolithically incorporating sealing means and a method of assembling the sleeve on a one-way valve body.

In accordance with the present invention, the elastomeric sleeve is molded as a tubular member with O-ring like portions or enlargements at or adjacent the opposite ends of the sleeve for effecting the sealing action of the sleeve with the outside surface of the one-way valve body. Further, the invention includes a method of automatic assembly of the elastomeric sleeve on the one-way valve body.

In preferred embodiments the O-ring like enlargements are formed at the opposite ends of the elastomeric sleeves. In one embodiment, the enlargements are centered symmetrically at the ends of the sleeve projecting inwardly from the inner surface and outwardly from the outer surface of the sleeve. In another embodiment, the enlargements project outwardly from the outer surface of the sleeve with the inner surface of the enlargement aligned with the inner surface of the sleeve. In a third embodiment the enlargements project inwardly from the inner surface of the sleeve and the outer surface of the enlargements are aligned with the outer surfaces of the sleeves. The enlargements may be round in transverse cross-section or some other shape. Other arrangements are also possible.

The enlargements on the sleeve have a diameter or radial dimension in the range of 2 to 4 times the thickness of the sleeve. As an example, if the sleeve thickness is 0.015 inches then the enlargement diameter or radial dimension is in the range of 0.030–0.060 inches.

In determining the dimensions and other features of the elastomeric sleeve the specific use of the one-way valve must be determined, that is, the type of material to be dispensed through the valve, and the characteristic of the fluid dispensed, whether as a spray, a mist or single drops. As a result, there are five basic factors influencing the type of elastomeric sleeve used with a one-way valve body. One factor is the sleeve thickness and other factors are the durometer of the material forming the sleeve and the kind of material, the ratio of the diameter of the sleeve to the diameter of the inside of the O-ring part or enlargement, the shape of a chamber formed between the outside surface of the sleeve and the inside surface of a laterally enclosing jacket about the sleeve. There may be a hole or opening through the jacket laterally enclosing the sleeve.

Due to the different characteristics regarding the type and condition of the fluid being dispensed, different conditions affect the five basic factors influencing the elastomeric sleeve. While it is not possible to consider the individual factors in isolation, because of economics, at least one of the factors, such as the thickness, can be maintained the same and different results can be achieved by varying the durometer of the sleeve material. By way of example, the durometers can be in the range of 15–60(A). It is also possible to vary the shape and size of the enlargements or O-rings at the ends of the sleeve.

Initially, the sleeve is molded with the monolithic O-ring like parts or enlargements. The sleeve is rolled in its axial direction on a support pin whereby it is rolled up from one end toward the other in preparation for placement on the valve body. The valve body is provided with reduced outside diameter sections at it opposite ends for receiving the O-ring like parts. In the rolled-up condition, there is a radially inner O-ring like part. This part is placed in the reduced diameter part at one end of the valve body. Next, the sleeve is rolled over the valve body until the other O-ring like part seats in the reduced diameter part at the opposite end of the valve body. While this assembling operation may be performed manually, preferably, it is carried out by a robot arm or automated assembly machinery.

Alternatively, the sleeve can be fitted on arms for laterally expanding the sleeve in axial alignment with the valve body. While the sleeve is held in an expanded shape for at least a maximum portion of its length, with compressed air expanding the sleeve radially outwardly, a valve body is inserted into the sleeve until the reduced diameter portion at one end fits within a O-ring like part at one end of the sleeve. The pins holding the sleeve in the expanded condition are then removed and the sleeve moves radially inwardly and fits tightly about the valve body and the O-ring like part at the opposite end of the sleeve is seated into a corresponding reduced diameter part on the valve body.

To assure that the O-ring like parts at the opposite ends of the sleeve are secured in sealed engagement with the outside surface of the valve body, a two-part enclosure cover or jackete is provided. The separate parts, having dimensions selected to correspond with the dimensions of the one-way valve body and the sleeve are placed onto the valve body one from each of the opposite ends until the cover parts press in the axial direction of the valve body against the one-way O-ring parts. In the position where the ends of the cover parts assure a sealing action between the O-ring like parts and the elastomeric sleeve, the cover parts are pressed together and are sealed together by conventional means, such as, ultrasonic, heat, radio frequency, or infrared welding, and chemically and mechanically effected connections.

The assembled cover parts secure the O-ring parts or enlargements in sealed engagement with the valve body and provide a chamber within which the elastomeric sleeve can expand radially outwardly permitting flow through the valve body. It is important to avoid irregular pressure distribution on the O-ring parts.

The combined valve body, elastomeric sleeve and cover is now ready to be inserted into or formed as part of the outlet end of a container for dispensing its contents.

A variety of materials can be used for the elastomeric sleeve with the material being selected for compatibility with the fluid to be dispensed and with the function or performance of the valve, and with any sterilization method used on the fluid. If thermal sterilization is used, the material selected must maintain its integrity throughout the temperature range of sterilization and for the time period required for sterilization. Sterilization may be achieved in other ways, such as by irradiation, electron beam, ethylene oxide and the like.

In place of the separate elastomeric sleeve and means for sealing the sleeve to the outside surface of the valve body, in the present invention the sealing means are formed as a monolithic part of the sleeve. The sleeve is axially elongated with the sealing means formed on each of the opposite ends spaced apart in the axial direction. The sealing means are in the form of O-ring like parts or enlargements. The enlargements can be centered on the sleeve so that they project radially outwardly and radially inwardly from the outer and inner sleeve surfaces. In another embodiment the enlargements project outwardly from the outer surface of the sleeve while the inner surface of the enlargement is aligned with the inner surface of the sleeve. In still another embodiment, the enlargements project inwardly from the inner surface of the sleeve and are aligned with the outer surface of the sleeve. A variety of regular or irregular shapes can be used for the enlargements. Further, other combinations of these embodiments are possible.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
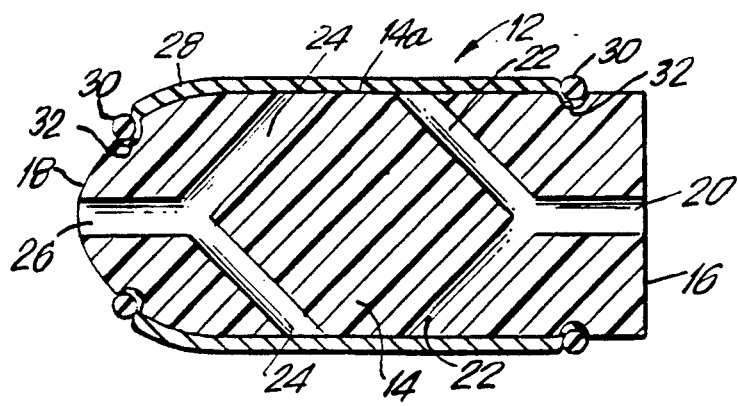
FIG. 1 is an axially extending sectional view of a valve assembly illustrating the prior art.

In FIG. 1, a valve assembly 12, as disclosed in U.S. Pat. No. 4,846,810, is shown including a valve body 14 elongated in the axial direction between an inlet end 16 and an outlet end 18. When the valve body is placed in an opening in a dispensing container, the inlet end 16 is in direct communication with the contents within the container.

A first outlet passageway 20 extends from the inlet end 16 for a portion of the axial length of the valve body 14. The opposite end of the first passageway 20 from the inlet end 16 branches into a plurality of separate first ports 22 spaced, equiangularly apart and extending to and through the outside surface 14a of the valve body 14. Spaced toward the outlet end 18 of the valve body are second ports 24, which extend inwardly from the outside surface 14a and are spaced equiangularly apart and terminate at an inner end of a second outlet passageway 26. The second outlet passageway 26 is axially aligned with the first outlet passageway 20 and the two passageways are spaced apart in the axial direction of the valve body.

Encircling the outside surface 14a and in normally tightly fitting contact with it is an elastomeric sleeve 28. The elastomeric sleeve extends over the outside surface 14a from adjacent the inlet end 16 to adjacent the outlet end 18 of the valve body 14. At each of its ends, spaced apart in the axial direction of the valve body, the sleeve 28 is sealed to the outside surface 14a of the valve body.

The sleeve 28 is stretched when it is placed on the valve body so that it fits tightly about the valve body forming a closure for the openings of the first and second ports 22, 24 extending through the outside surface of the valve body 14.

The sleeve 28 is secured and sealed to the outside surface 14a of the valve body 14 by O-ring members 30 seated in recesses 32 in the outside surface of the valve body. The particular means used for sealing the opposite ends of the sheath may vary depending on the type of materials used and the characteristics of the fluid being dispensed. In addition to O-ring members 30, the sleeve can be sealed by thermal or chemical bonding operations or by the use of adhesives.

If the valve assembly 12 is mounted on a container which can be squeezed or compressed, the contents will flow out through the valve assembly 12 passing first through the first outlet passageway 20 into the valve body 14. As the fluid flows through the first outlet passageway 20 it enters into the first ports 22 and flows generally radially outwardly to the outside surface 14a of the valve body. The pressure of the fluid acting on the inside surface of the elastomeric sleeve 28 causes it to expand outwardly, so that the fluid flows between the outside surface 14a of the valve body 14 and the inside surface 28a of the sleeve 28 until it reaches one of the second ports 24 for flow radially inwardly. From the second ports 24 the fluid enters the inner end of the second outlet passageway 26 and out of the valve assembly through the outlet end 18. When the fluid is not flowing through the valve assembly 12, the elastomeric sleeve 28 forms a closure for each of the first and second ports 22, 24 at the outside surface 14a of the valve body 14. As a result, after fluid has been dispensed, contaminants can not enter through the valve assembly back into the container. When the fluid expands the sleeve 28, the flow of fluid will block any contaminants from passing into the container. When the fluid being dispensed flows into the second ports 24, the elastomeric sleeve 28 will contract or rebound and block the ports at the outside surface 14a of the valve body 14, so that backflow into the container through the second outlet passageway 26 is prevented.

Figure 2:
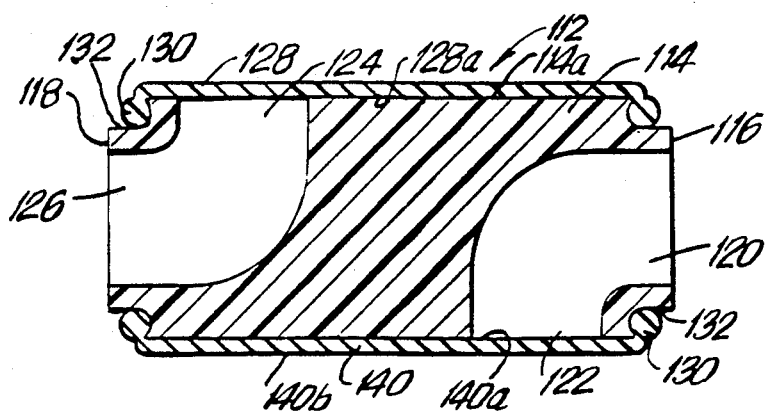
FIG. 2 is a view similar to FIG. 1, however, showing the elastomeric sleeve embodying the present invention in position on a valve body.

To simplify the valve assembly 12 shown in FIG. 1 and to reduce the number of components, the cost of the elastomeric sleeve and the assembly of the sleeve on the valve body, the present invention provides a valve assembly 112 as shown in FIG. 2. The valve assembly 112 includes an axially extending valve body 114 having an inlet end 116 and an outlet end 118. The inlet end 116 is placed in a dispensing container, not shown, in direct communication with the fluid to be dispensed within the container. A first outlet passageway 120 extends from the inlet end 116 first in the axial direction and then through a port 122 to the outside surface 114a of the valve body 114. The outside surface 114a is in contact with the inside surface 128a of the elastomeric sleeve 128. Spaced from the first port 122 toward the outlet end 118 is a second port 124 opening through the outside surface 114a of the valve body 114. The second port 124 opens into a second outlet passageway 126 for dispensing fluid through the outlet end of the valve assembly 112.

The elastomeric sleeve 128 can be formed of rubber, or a thermoplastic or thermosetting elastomer and is provided with O-ring like enlargements 130 at its opposite ends and these enlargements are secured within reduced diameter end sections 132 at the opposite ends of the valve body 114.

In use, the inlet end 116 of the valve body 112 is placed in an outlet from a dispensing container so that, by compressing the container or activating a metered dose pump, fluid can be displaced through the valve assembly in the same manner as described above for the valve assembly 12 in FIG. 1.

Figure 3:
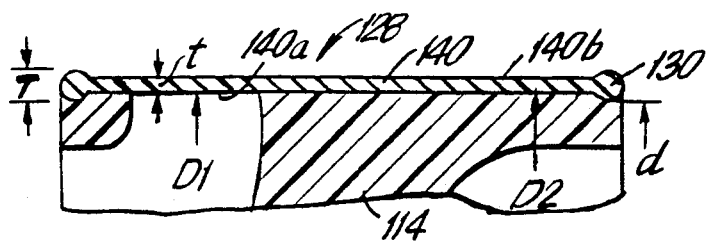
FIG. 3 is a partial axially extending view of one embodiment of the elastomeric sleeve in accordance with the present invention.

The elastomeric sheath 128 in FIG. 2 is illustrated in the as-molded form in FIG. 3. The elastomeric sleeve 128 has an axially extending tubular section 140 with a radially inner surface 140a and a radially outer surface 140b. At each of the opposite ends of the tubular section 140 are O-ring-like enlargements 130. The enlargements are centered on the ends of the tubular section so that the enlargements project outwardly from the outer surface 140a and inwardly from the inner surface 140b of the tubular section 140. The tubular section 140 has a thickness of approximately 0.010–0.025 inches. The diameter T of the enlargements 130 are in the range of T=2 to 4 times the wall thickness t of the tubular section 140. As a result, the diameter of the arrangements T is in the range of 0.020–0.100 inches. Further, due to the centered arrangement of the enlargement 130, the inside diameter of the enlargements as molded have a diameter d while the inside surface of the tubular section 140 has a larger diameter D1.

Figure 4:
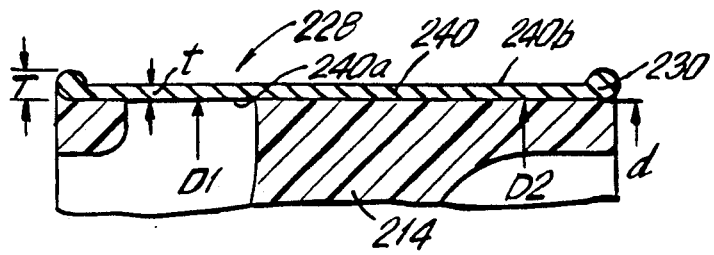
FIG. 4 is a view similar to FIG. 3 showing another embodiment of the elastomeric sleeve.

In FIG. 4 another embodiment of the elastomeric sleeve 228 is shown where the enlargements 230 have an inner surface aligned with the inner surface 240a of the tubular section 240 and an outer surface projecting radially outwardly from the outer surface 240b.

Figure 5:
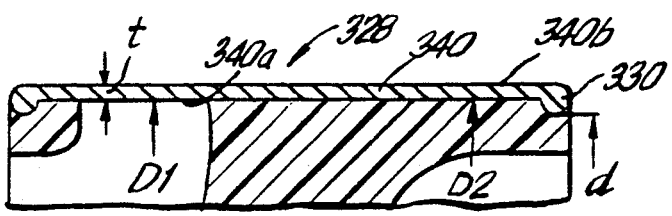
FIG. 5 is a view similar to FIGS. 3 and 4 displaying still another embodiment of the elastomeric sleeve of the present invention.

In FIG. 5 a third embodiment of the elastomeric sleeve 28 is displayed with the enlargements 330 projecting inwardly from the inner surface 240a of the tubular section with the outer surface of the enlargements aligned with the outer surface 340b of the tubular section.

These different arrangements of the elastomeric sleeve 128, 228, 328 afford the requisite sealing action depending on the configuration of the valve body and of the enclosing support cover for the valve assembly. As mentioned above, the elastomeric sleeves 128, 228, 328 shown in FIGS. 3, 4 and 5 are in the as-molded state. The inside diameter D1 of the tubular section is smaller than the outside diameter D2 of the valve body, so that when placed on the valve body the sleeve is expanded and fits tightly about the outer surface of the valve body assuring a positive closure for the ports 122, 124 in the first and second outlet passageways 120, 126.

Figure 6A:
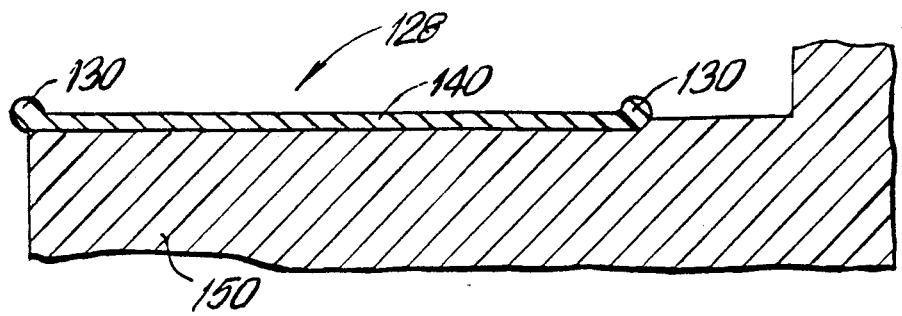
FIGS. 6A-6D illustrate various steps in the preparation of the elastomeric sleeve for placement on a valve body.

In the assembly operation, as shown in FIG. 6A, the elastomeric sleeve 128 has been molded and is supported on a core pin 150. While it may be possible to carry out the assembly steps manually, for reasons of costs, efficiency and accuracy, the assembly steps are carried out by a robot arm or automated mechanisms, not shown.

Figure 6B:
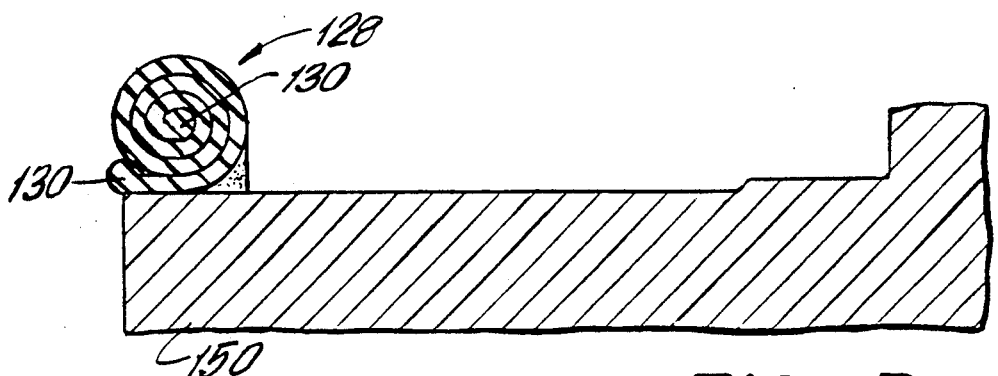
Figure 6C:
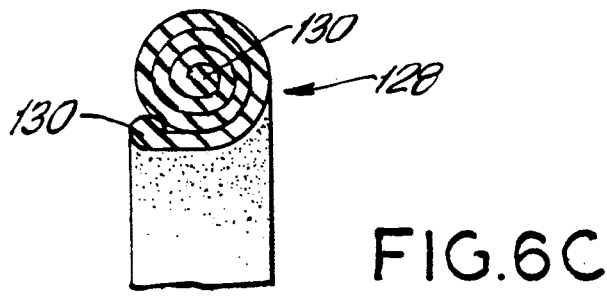

Initially, as shown in FIGS. 6A and 6B, while still on the molding core pin, the sleeve 128 is rolled up upon itself forming an annular rolled unit as shown in FIG. 6B. In FIG. 6C the annular rolled unit is shown removed from the core pin. In this condition the inside of the annular unit has a diameter corresponding to the diameter of the inside surface 140a of the tubular section 140 of the sleeve 128. This inside diameter D1 is approximately equal to the diameter of the reduced diameter end section 132 of the valve body 112, note FIG. 2.

In assembling the annular unit of FIG. 6B and 6C on the valve body 114 in an automatic operation, the radially outer enlargement 130 of the rolled-up unit is placed in the reduced diameter section 132 at one end of the valve body 114 and the elastomeric sleeve 128 is unrolled from one end to the other until the enlargement 130 within the center of the rolled-up annular unit, note FIG. 6C, seats in the reduced diameter section 132 at the opposite end of the valve body, not shown. The inside diameter of the enlargement 130 can be made smaller than the diameter of the reduced diameter section 132 so that a gripping action is provided. This, however, is not a prerequisite, since other means can be used, as will be described later, for assuring the seal between the enlargements 130 and the valve body.

The embodiments in FIGS. 4 and 5 can be assembled in the same manner as shown in FIGS. 6A-6D.

Figure 7A:
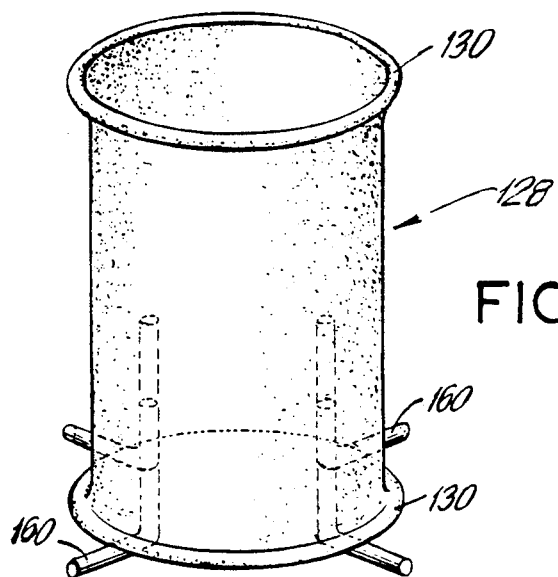
FIG. 7A-7B show the steps in an alternate placement of the elastomeric sleeve on a valve body.
Figure 7B:
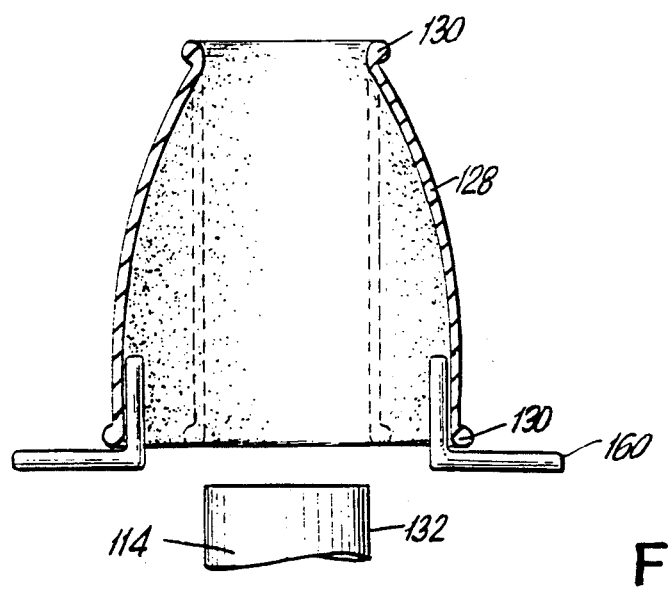

In FIGS. 7A and 7B another automatic assembly of the sleeve on the valve body is shown. In this embodiment, the elastomeric sleeve 128 is in the as-molded condition and is not rolled up as in the previous embodiment. As shown in FIG. 7A, the pins 160 are inserted into one end of the sleeve 128 extending for a portion of the axial length of the sleeve.

In FIG. 7B the sleeve is shown in dashed lines in the as-molded shape and in full lines in the expanded shape. From the position shown in FIG. 7A the end of the sleeve 128 mounted on the pins 160 is expanded by moving the pins radially outwardly. As a result, one end of the sleeve 128 is expanded while the other end remains in its initial as-molded shape. If necessary, compressed air can be blown into the sleeve to facilitate its expansion. With the sleeve expanded as shown in FIG. 7B, the valve body 114 is inserted into the sleeve until the unexpanded enlargement 130 seats in the reduced diameter section 132 of the valve body. Next, the pins are withdrawn and the expanded enlargement 130 seats in the reduced diameter section 132 at the opposite end of the valve body completing the assembly of the sleeve on the valve body.

Figure 6D:
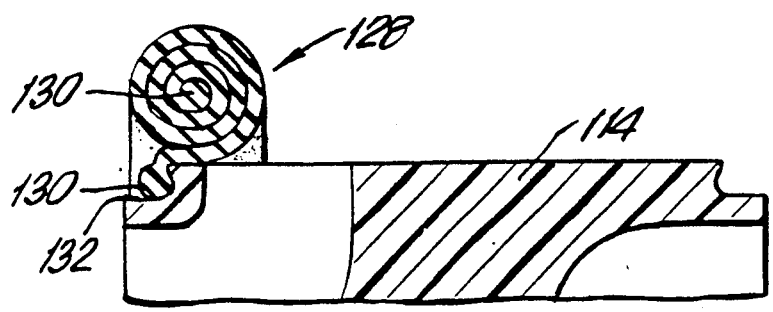
Figure 8:
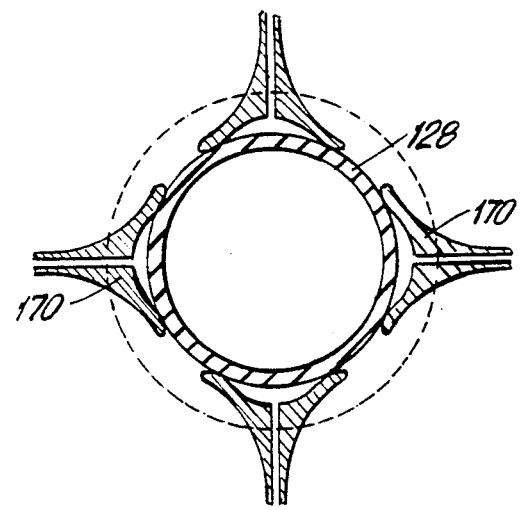
FIG. 8 is a view transverse to the axis of the sleeve showing yet another assembly method utilizing a vacuum.

In FIG. 8 another assembly arrangement is shown. Located around the outside surface of the sleeve, shown in transverse cross-section, are four vacuum members 170. During assembly of the elastomeric sleeve 128 on a valve body, not shown, a vacuum is applied to the sleeve at each of the vacuum members 170. The vacuum members are moved radially outwardly until the sleeve reaches the position shown in dotted lines. The valve body is inserted into the sleeve and the vacuum is discontinued in the vacuum members, so that the sleeve 128 moves inwardly into tightly fitting contact with the valve body 114 and with the O-ring-like enlargements 130 on the ends of the sleeve seated into the reduced diameter sections 132, such as shown in FIG. 6D.

As can be readily appreciated, other automatic assembly operations can be used for placing the elastomeric sleeve on the valve body.

In FIG. 2 the elastomeric sleeve 128 is shown in tightly fitting contact with the outside surface 114a of the valve body 114. To assure the sealed contact between the enlargements 130 and the reduced diameter ends 132 of the valve body 114 a cover or jacket can be positioned about the combination of the valve body and the elastomeric sleeve, note FIGS. 9 and 10.

If a unitary cover is slid onto the assembly of the elastomeric in the valve body there is a tendency, at least at one end, to displace the sleeve out of sealing contact.

Figure 9:
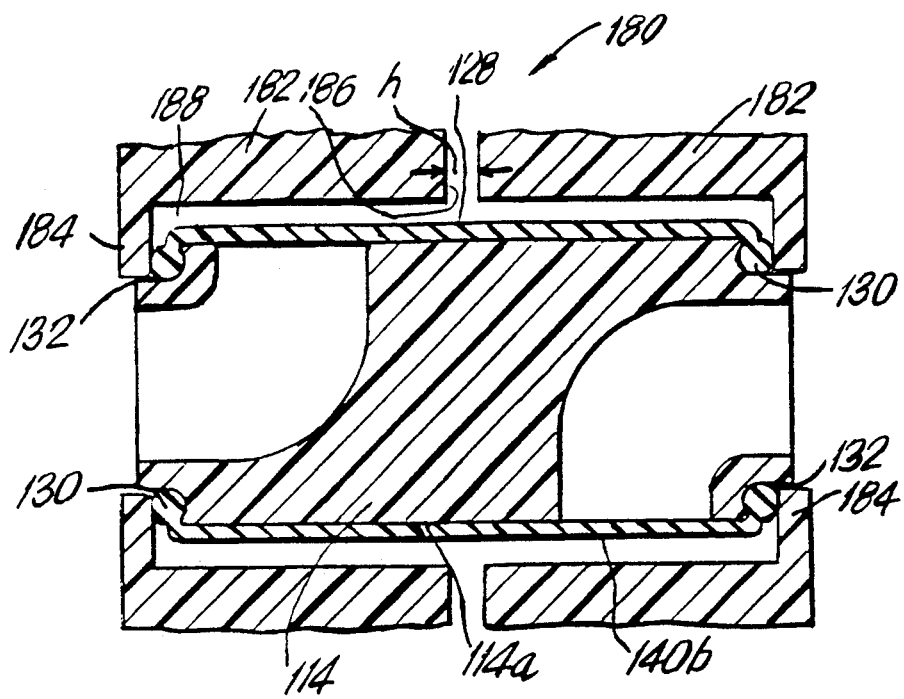
FIG. 9 is a partial axially extending view of the sleeve assembled on a valve body and just before compressing and enclosing it within a support cover.
Figure 10:
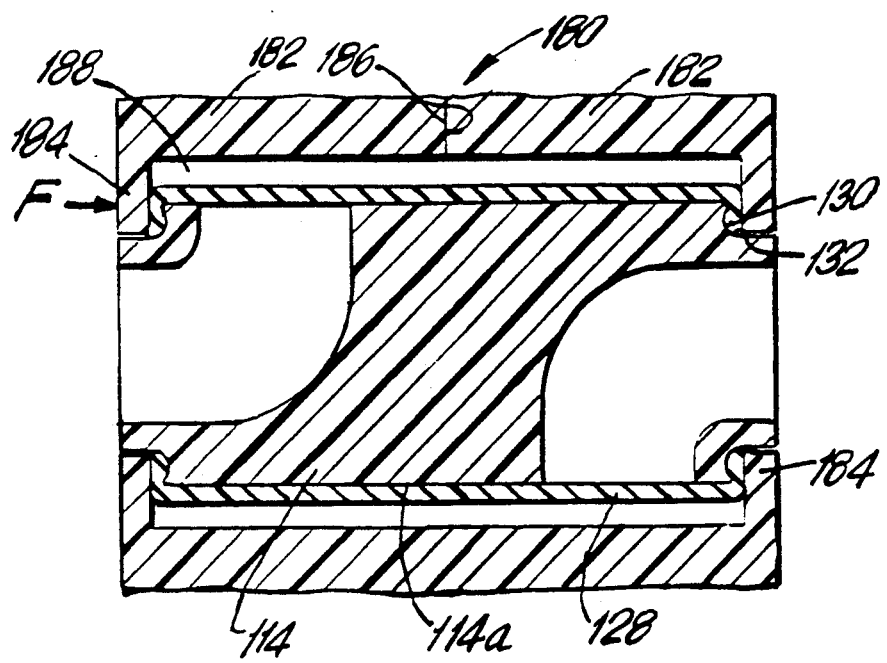
FIG. 10 is an axially extending sectional view of the arrangement shown in FIG. 9 completely assembled.

In the present invention, as shown in FIG. 9, the cover 180 is made up of two cover sections 182. The cover sections are placed on the assembly of the valve body 114 and the elastomeric sleeve 128 one from each of the opposite ends. When the end walls 184 contact the enlargements 130 the center ends 186 of the cover 180 have a space h between them.

To complete the cover 180 the two cover sections 182 are pressed together by a force F until the center ends 186 of the cover section 182 contact and are forced against one another. To complete the cover 180 the sections 182 are welded together at the center ends 186 or other connecting means can be used.

When the two cover sections 182, 182 are pressed together the ends walls 184, 184 press against the adjacent enlargements 130 assuring a sealing contact between the enlargements and the reduced diameter end sections 132 of the valve body.

As can be seen by comparing FIGS. 3-5 and FIGS. 9, as formed, the inside diameter of the sleeve D1 is smaller than the outside diameter D2 of the valve body. As a result, the elastomeric sleeve 128 is tightly fitted about the outside surface 114a of the valve body. Further, the outside surface 140b of the sleeve's tubular section 140 is spaced radially inwardly from the inside surface of the cover 180. When fluid is dispensed through the valve body it forces the sleeve radially outwardly affording flow between the first passageways 120 and the second passageways 126. A vent hole can be placed through the cover 180 opening into the space 186 between the outside surface 140b of the sleeve 128 and the inside surface of the cover 180 to assure that the sleeve rebounds into contact with the outside surface of the valve body when dispensing flow through the valve body is completed.

While FIGS. 3-5 show the elastomeric sleeve 128, 228, 328 as having generally rounded enlargements 130, 230, 330, the enlargements can be formed of a variety of other regular or irregular shapes depending on the operating conditions of the valve assembly, the configuration of the valve body 114 and the cover 180, and of the material forming the elastomeric sleeve.

While specific embodiments of the invention have been shown and described in detail to illustrate the application of the inventive principles, it will be understood that the invention may be embodied otherwise without departing from such principles.

I claim:

1. A one-way valve for dispensing a fluid material from a container comprising a valve body having an inlet end for receiving the fluid material from the container and an outlet end for dispensing the fluid material out of the valve body, said valve body has a circumferentially extending outside surface extending in the direction between the inlet end and the outlet end of said valve body, at least one first outlet passageway extending from the inlet end of said valve body to the outside surface thereof, at least one second outlet passageway extending from the outside surface of said valve body to the outlet end thereof, at the outside surface of the valve body said first and second outlet passageways arranged in spaced relation, an elastomeric sleeve tightly fitted around the outside surface of said valve body and forming a closure at the outside surface for said first and second outlet passageways, said sleeve having a radially inner surface, a radially outer surface, a first end located adjacent said inlet end and a second end located adjacent said outlet end, and means formed monolithically with and adjacent said first and second ends of said sleeve and forming a fluid tight seal with said valve body, said means comprises an O-ring like enlargement on each of the opposite ends of said sleeve, said valve body has an axially extending central section contacted by said sleeve and a pair of opposite end sections recessed inwardly from said center section and having a smaller diameter than said center section, said end sections each forming an annular shoulder at the opposite ends of said center section, and said enlargements seated in sealing contact with said shoulders.

2. A one-way valve, as set forth in claim 1, wherein said enlargement has a radially inner surface and a radially outer surface with the radially inner surface projecting inwardly from the radially inner surface of said sleeve and the radially outer surface of said enlargement projecting radially outwardly from the radially outer surface of said sleeve.

3. A one-way valve, as set forth in claim 1, wherein said O-ring-like enlargement having a radially inner surface and a radially outer surface with the radially inner surface aligned with the radially inner surface of said sleeve and the radially outer surface projecting radially outwardly from the radially outer surface of said sleeve.

4. A one-way valve, as set forth in claim 1, wherein said O-ring-like enlargement having a radially inner surface and a radially outer surface with the radially inner surface projecting inwardly from the radially inner surface of said sleeve and the radially outer surface aligned with the radially outer surface of said sleeve.

5. A one-way valve, as set forth in claim 1, wherein said enlargement having a thickness in the radial direction in the range of 2-4 times the thickness of the sleeve in the radial direction between the enlargements.

6. A one-way valve, as set forth in claim 5, wherein said enlargement has at lest some outer surfaces extending in a non-circular manner.

7. A one-way valve, as set forth in claim 5, wherein said enlargement projects at least one of radially inwardly from and radially outwardly from said sleeve.

8. A one-way valve for dispensing a fluid material from a container comprising a valve body having an inlet end for receiving the fluid material from the container and an outlet end for dispensing the fluid material out of the valve body, said valve body has a circumferentially extending outside surface extending in the direction between the inlet end and the outlet end of said valve body, at least one first outlet passageway extending from the inlet end of said valve body to the outside surface thereof, at least one second outlet passageway extending from the outside surface of said valve body to the outlet end thereof, at the outside surface of the valve body said first and second outlet passageways arranged in spaced relation, an elastomeric sleeve tightly fitted around the outside surface of said valve body and forming a closure at the outside surface for said first and second outlet passageways, said sleeve having a radially inner surface, a radially outer surface, a first end located adjacent said inlet end and a second end located adjacent said outlet end, and means formed monolithically with and adjacent said first and second ends of said sleeve and forming a fluid tight seal with said valve body, said means comprises an O-ring like enlargement on each of the opposite ends of said sleeve, and an enclosing cover is provided about said sleeve extending between the enlargements at the opposite ends thereof and said cover bearing against said enlargements and pressing said enlargements into sealed contact with said valve body.

9. A one-way valve, as set forth in claim 8, wherein said enclosing cover is divided transversely of the axial direction of said valve body into two parts for purposes of assembling the enclosing cover about the valve body and said two ring parts being forced in the axial direction into contact with one another and integrally joined together.

* * * * *